United States Patent [19]

Maeda

[11] Patent Number: 5,359,421
[45] Date of Patent: Oct. 25, 1994

[54] BEZEL WITH A PAIR OF OPPOSING ELONGATE RIBS AND A NUMBER OF SMALLER RIBS FOR CONTACTING A CATHODE RAY TUBE

[75] Inventor: Hiroyoshi Maeda, Kanagawa, Japan

[73] Assignee: Sony Corporation, Tokyo, Japan

[21] Appl. No.: 852,725

[22] Filed: Mar. 17, 1992

[30] Foreign Application Priority Data

Mar. 25, 1991 [JP] Japan .................. 3-082841

[51] Int. Cl.$^5$ .............................. H04N 5/645
[52] U.S. Cl. .................... 348/818; 348/825; 348/836
[58] Field of Search ............... 358/245, 247, 248, 249, 358/254, 229; 220/2.1 A, 2.3 A; 312/72; D14/113, 114, 115

[56] References Cited

U.S. PATENT DOCUMENTS

| 4,360,838 | 11/1982 | Babicz et al. | 358/245 |
| 4,853,790 | 8/1989 | Dickie | 358/245 |
| 5,067,022 | 11/1991 | Huerre et al. | 358/245 |
| 5,084,757 | 1/1992 | Leo et al. | 358/248 |

Primary Examiner—Edward L. Coles, Sr.
Assistant Examiner—Thomas D. Lee
Attorney, Agent, or Firm—Lewis H. Eslinger; Jay H. Maioli

[57] ABSTRACT

A bezel which minimizes possible production of powder by rubbing thereof with a cathode ray tube to prevent possible deterioration of an appearance of a display unit in which the bezel and the cathode ray tube are assembled. The bezel has, around a substantially rectangular opening thereof, a contact area at which it is to contact with a cathode ray tube to which the bezel is to be assembled. The contact area is provided by a plurality of ribs formed in a suitably spaced relationship from each other on the bezel along an inner periphery of the opening in such a manner as to extend perpendicularly to the inner periphery of the opening. Some of the ribs which are provided along a pair or two pairs of opposing edges of the inner periphery of the opening may be replaced by different ribs which individually extend in parallel to the edges of the inner periphery of the opening.

4 Claims, 4 Drawing Sheets

BEZEL WITH A PAIR OF OPPOSING ELONGATE RIBS AND A NUMBER OF SMALLER RIBS FOR CONTACTING A CATHODE RAY TUBE

BACKGROUND OF THE INVENTION

1. Field of the Invention

This invention relates to a bezel which is mounted on a front face of a cathode ray tube (CRT) of a television set or the like.

2. Description of the Prior Art

A display unit such as a television set normally employs a CRT. and a bezel is mounted on a front face of such CRT. An exemplary one of conventional display units which employ a CRT is shown in FIG. 6. Referring to FIG. 6, a bezel 2 is mounted on a front face of a CRT 1 such that a tube face 1a of the CRT 1 is exposed forwardly through a substantially rectangular opening 2a of the bezel 2. The bezel 2 is secured to the CRT 1, for example, by means of a plurality of fastening screws N which extend through coupling tabs 1b of the CRT 1 and are screwed into threaded holes 2b of the bezel 1 shown in FIG. 7.

The bezel 2 has a rib 2d formed thereon at a portion thereof at which it contacts with the CRT 1, that is, a peripheral portion of the bezel 2 around the opening 2a. Referring to FIGS. 7 and 8 the rib 2d extends along a frame portion 2c formed along the entire inner periphery of the bezel 2 around the opening 2a and has an offset or step of, for example, 0.3 to 0.5 mm from a face 2c of the frame portion 2c opposing to the tube face 1a of the CRT 1. The bezel 2 is thus held in contact at the rib 2d thereof with the tube face 1a of the CRT 1 as seen in FIG. 8.

However, since it is not preferable for the sake of a good appearance of the display unit that a great gap is provided between opposing faces of the CRT 1 and the bezel 2, it is difficult to have a great contact area between the rib 2d of the bezel 2 and the tube face 1a of the CRT 1.

Consequently, the width of the contacting face of the bezel 2, that is, the width of the rib 2d, is limited. Besides, since the rib 2d is provided on the entire inner periphery of the bezel 2, a considerable variation occurs among bezels upon molding, and quality control in the accuracy of the rib height is very difficult.

The small area of the contacting face of the bezel 2 gives rise to another problem. In particular, while such bezel is normally molded from a plastic material such as an ABS resin, fine powder often drops, after the bezel 2 is assembled, from the surface of the rib 2d of the bezel 2 due to rubbing between the tube face 1a of the CRT 1 and the rib 2d which occurs during transportation of the CRT 1 or the like, and such fine powder often appears on the tube face 1a of the CRT 1 and gives a bad influence on the appearance of the display unit.

SUMMARY OF THE INVENTION

It is an object of the present invention to provide a bezel which minimizes possible production of powder by rubbing thereof with a cathode ray tube to prevent possible deterioration of an appearance of a display unit in which the bezel and the cathode ray tube are assembled.

In order to attain the object, according to an aspect of the present invention, there is provided a bezel having a substantially rectangular opening formed therein, the bezel having a contact area around the opening at which the bezel is to contact with a cathode ray tube to which the bezel is to be assembled, the contact area being provided by a plurality of ribs formed in a suitably spaced relationship from each other on the bezel alone an inner periphery of the opening in such a manner as to extend perpendicularly to the inner periphery of the opening.

With the bezel, since the ribs are formed as the contact area for a cathode ray tube in such a manner as to extend perpendicularly to the inner periphery of the opening of the bezel, the contacting areas thereof can be increased in a direction away from the opening. Further since a great contact area of the bezel for a cathode ray tube is assured and the ribs are contacted, when the bezel is assembled to a cathode ray tube, with outer locations of the cathode ray tube, fine powder produced by rubbing will not appear in the opening of the bezel, that is, on a tube face of a cathode ray tube to which the bezel is assembled. Consequently, an appearance of a display unit in which the bezel and the cathode ray tube are assembled will not be deteriorated by such fine powder.

According to another aspect of the present invention, there is provided bezel having a substantially rectangular opening formed therein, the bezel having a contact area around the opening at which the bezel is to contact with a cathode ray tube to which the bezel is to be assembled, the contact area being provided by a combination of a pair of first ribs formed on the bezel along a pair of opposing edges of the inner periphery of the opening in such a manner as to extend in parallel to the edges and a plurality of second ribs formed in a suitably spaced relationship from each other on the bezel along the remaining part of the inner periphery of the opening in such a manner as to extend perpendicularly to the inner periphery of the opening.

With the bezel, since the first ribs extending along the opposing edges of the inner periphery of the opening and the second ribs extending perpendicularly to the inner periphery of the opening are formed on the bezel, it is advantageous in that possible occurrence of drops of fine powder can be suppressed effectively for individual locations and that the degree of freedom in designing of a bezel can be increased. Further, the bezel can be designed so that it may not suffer from a sink or weld on a surface thereof upon molding.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
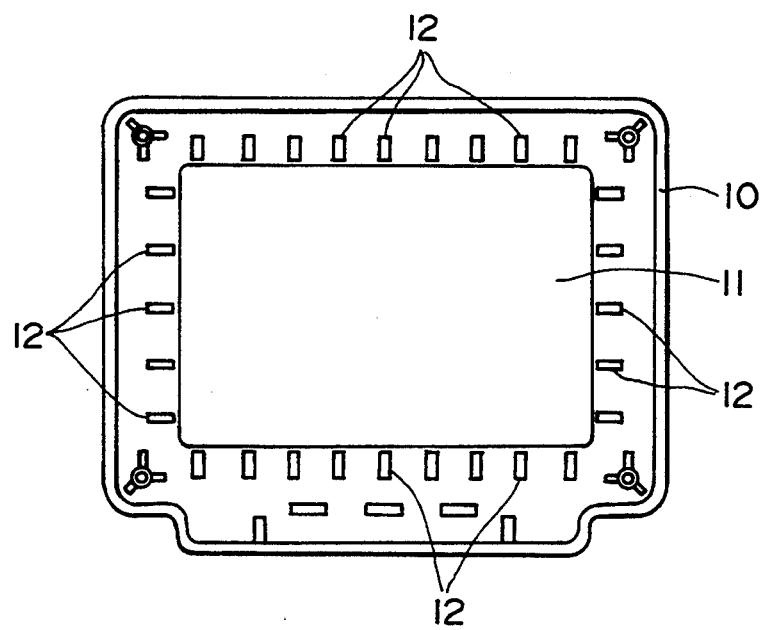
FIG. 1 is a rear elevational view of a bezel showing a preferred embodiment of the present invention.
Figure 2:
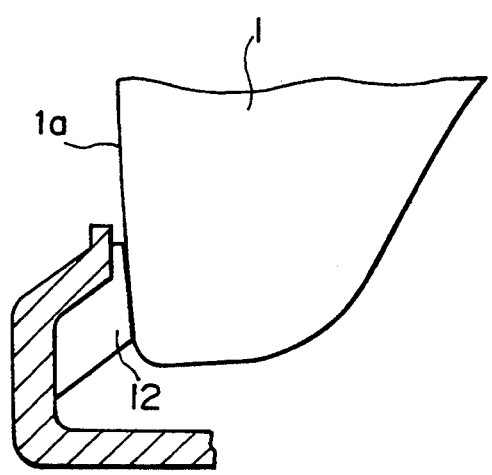
FIG. 2 is an enlarged partial sectional view showing a rib of the bezel of FIG. 1 in contact with a CRT.
Figure 7:
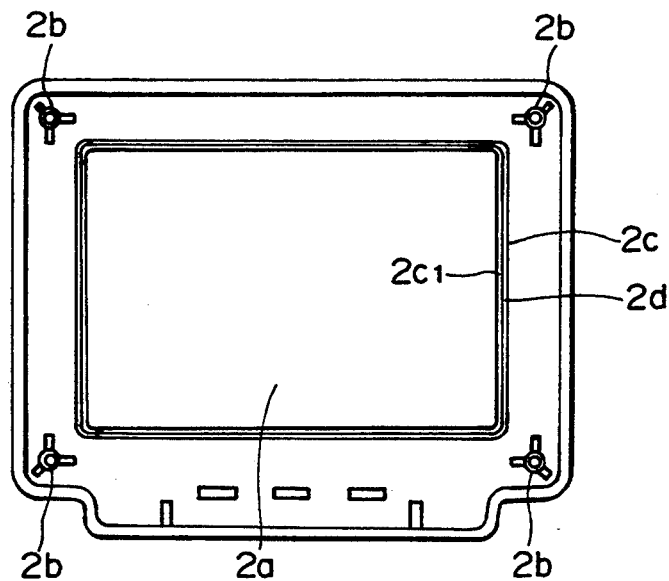
FIG. 7 is a rear elevational view showing a conventional bezel.
Figure 8:
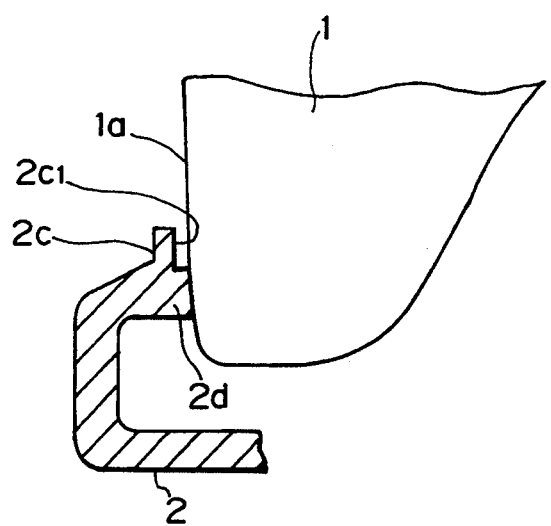
FIG. 8 is an enlarged partial sectional view showing a rib of the bezel of FIG. 7 in contact with a CRT.

Referring first to FIGS. 1 and 2, there is shown a bezel to which the present invention is applied. The bezel shown is generally denoted at 10 and has a substantially rectangular opening 11 through which a tube face 1a of a CRT 1 to which the bezel 10 is assembled is exposed outside. A plurality of ribs 12 are formed in a suitably spaced relationship from each other on an inner face of the bezel 10 around an inner periphery of the opening 11 such that, when the bezel 10 is assembled to the CRT 1, they contact with the tube face 1a of the CRT 1. Each of the ribs 12 extends perpendicularly to an adjacent edge portion of the inner periphery of the opening 11 of the bezel 10 such that it may have a substantially rectangular contact face extending outwardly from the opening 11.

Where the ribs 12 are formed in this manner, a great contact area can be assured between the bezel 10 and the tube face 1a of the CRT 1, and besides, as seen also from FIG. 2, when the bezel 10 is assembled to the CRT 1, the ribs 12 can contact at outer peripheral portions of the tube face 1a comparing with the conventional bezel 2 described hereinabove with references to FIGS. 7 and 8. Where the total contact area is increased in this manner, drops of fine powder will be caused less readily, and besides since the contact faces are positioned at the outer peripheral portions of the tube face 1a, that is, spaced away from the opening 11, even if drops of fine powder occurs, such fine powder will not stick to a portion of the tube face 1a which is exposed outside through the opening 11 of the bezel 10. There is a further advantage that, as the contact area increases, the accuracy in height of the ribs 12 can be assured more readily upon molding of the bezel 10.

Figure 3:
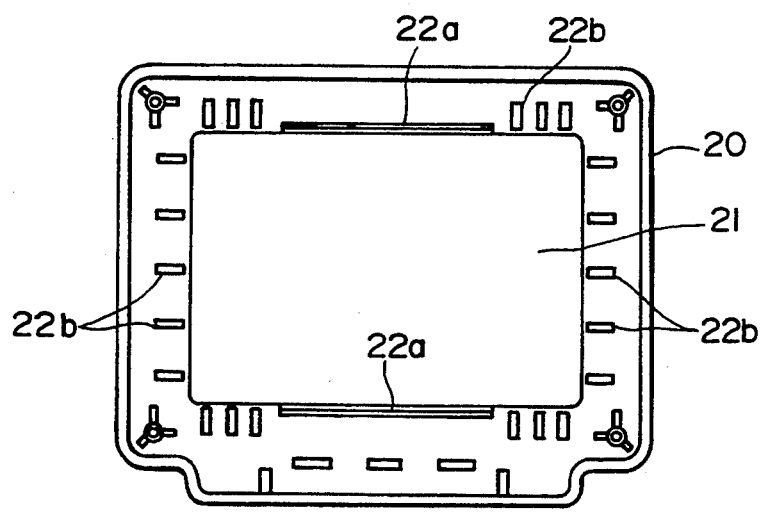
FIG. 3 is a rear elevational view of a bezel showing another preferred embodiment of the present invention.

Referring now to FIG. 3, there is shown another bezel to which the present invention is applied. The bezel 20 has a pair of ribs 22a formed adjacent and along central portions of a pair of upper and lower horizontal edges of an inner periphery of a substantially rectangular opening 21 thereof, and a plurality of ribs 22b formed in a suitably spaced relationship from each other on the remaining portion of the inner periphery of the opening 21, that is, on the opposite vertical edges and the opposite end portions of the upper and lower horizontal edges of the inner periphery of the opening 21 and each extending perpendicularly to an adjacent edge portion of the inner periphery of the opening 21 similarly to the ribs 12 of the bezel 10 described hereinabove with reference to FIGS. 1 and 2. Contact faces of the bezel 20 are thus provided by the two kinds of ribs 22a and 22b.

The ribs 22a at the upper and lower horizontal edge portions of the opening 21 can have comparatively great contact areas in the horizontal leftward and rightward directions of the display unit, and accordingly, drops of fine powder will not be caused readily by horizontal vibrations. Meanwhile, the ribs 22b along the upper and lower horizontal edge portions of the opening 21 can have comparatively great contact areas in the vertical upward and downward direction of the display unit, and accordingly, drops of fine powder will not be caused readily by vertical vibrations. Thus, if the ribs 22a and 22b are provided appropriately at locations at which drops of fine powder are likely to be caused by vibrations in predetermined directions, then adverse affects of drops of fine powder can be eliminated effectively.

The construction of the bezel 20 of the present embodiment not only can prevent sticking of powder to the tube face 1a of the CRT 1 due to an increase of contact areas toward the outer side from the opening 21 by the ribs 22b similarly to the bezel 10 of the preceding embodiment of FIGS. 1 and 2 but also can increase the degree of freedom in designing. In particular, while the internal profile of a bezel varies depending upon a profile of a CRT or a display unit housing, it sometimes occurs that it is difficult to provide a plurality of ribs along an entire periphery of an opening of the bezel such that they extend perpendicularly to the periphery of the opening. In such an instance, it is an alternative solution that such ribs 22a which extend along horizontal edges of the opening 21 and the ribs 22b which extend perpendicularly to the inner periphery of the opening 21 are provided in combination as in the case of the bezel of the embodiment shown in FIG. 3. Such combination can be set so that a sink or weld may not be produced upon molding.

Figure 4:
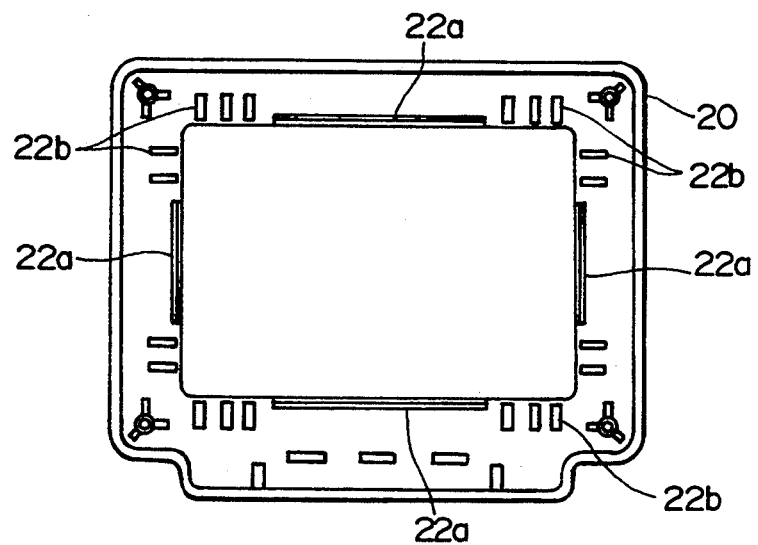
FIG. 4 is a similar view but showing a further preferred embodiment of the present invention.
Figure 5:
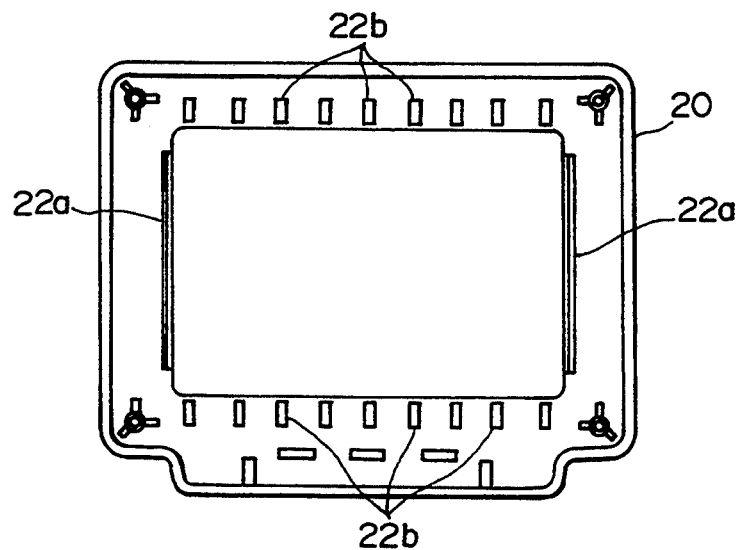
FIG. 5 is a similar view but showing a still further preferred embodiment of the present invention.
Figure 6:
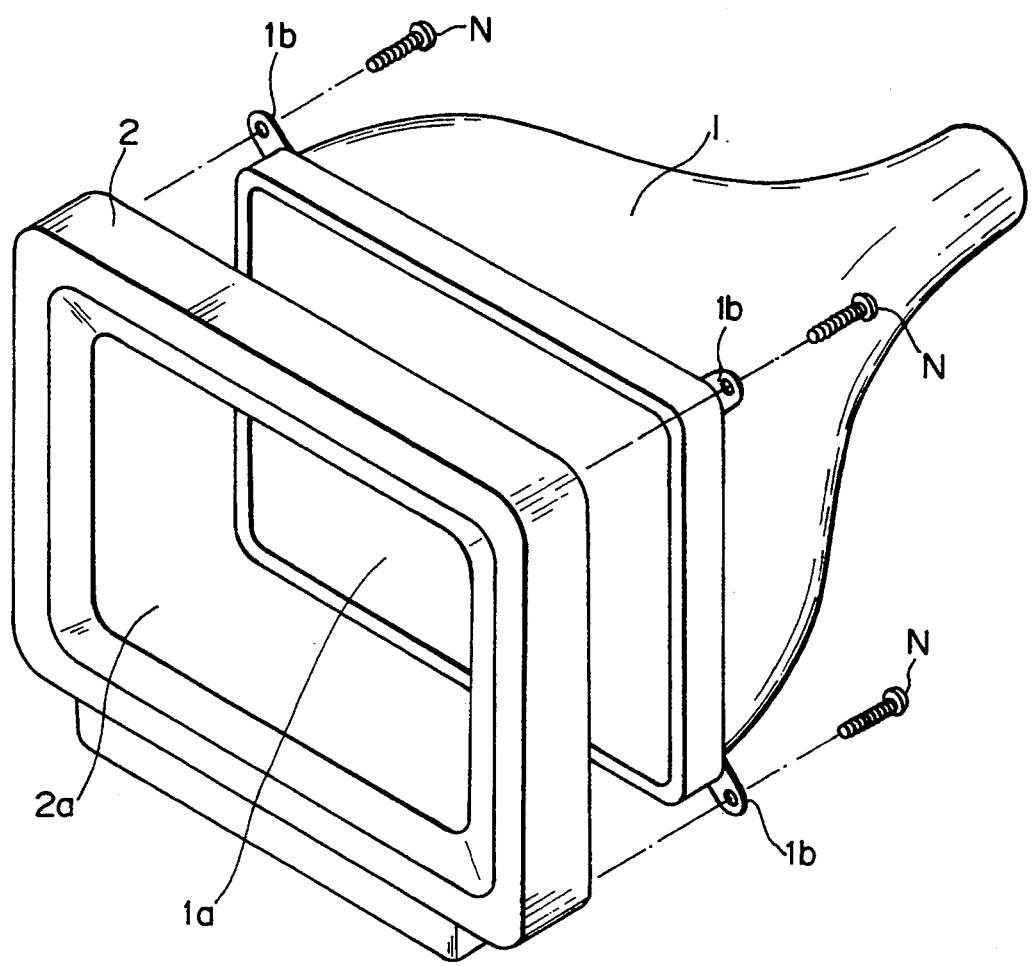
FIG. 6 is a schematic view illustrating assembly of a bezel to a CRT.

Such two kinds of ribs 22a and 22b as described above may be combined in other several manners to form contacting portions for the tube face 1a of the CRT 1. For example, the ribs 22a may be formed along portions of the four edges of the inner periphery of the substantially rectangular opening 21 of the bezel 20 while the ribs 22b are formed along the remaining portions of the four edges of the inner periphery of the opening 21 as shown in FIG. 4, or the ribs 22a may be formed along the opposing left and right vertical edges of the inner periphery of the substantially rectangular opening 21 of the bezel 20 while the ribs 22b are formed along the upper and lower horizontal edges of the inner periphery of the substantially rectangular opening 21 as shown in FIG. 5. Thus, a suitable combination of such ribs 22a and 22b may be employed depending upon designing features of a display unit to which the bezel is to be applied and/or upon relationships between possible drops of fine power from various portions of the display unit and a direction of vibrations possibly applied the display unit.

Having now fully described the invention, it will be apparent to one of ordinary skill in the art that many changes and modifications can be made thereto without departing from the spirit and scope of the invention as set forth herein.

What is claimed is:

1. A bezel having a substantially rectangular opening formed therein, said bezel having a contact area around said opening at which said bezel is to contact a cathode ray tube to which said bezel is to be assembled, said contact area being provided by a combination of a pair of first ribs formed on said bezel along a pair of opposing edges of the inner periphery of said opening in such a manner as to extend in parallel to the edges and a plurality of second ribs formed in a suitably spaced relationship from each other on said bezel along the remaining part of the inner periphery of said opening in such a manner as to extend perpendicularly to the inner periphery of said opening.

2. A bezel according to claim 1, wherein said first ribs are formed along central portions of the upper and lower horizontal edges of the inner periphery of said opening while said second ribs are formed along the left and right vertical edges and the remaining portions of the upper and lower horizontal edges of the inner periphery of said opening.

3. A bezel according to claim 1, wherein said first ribs are formed along the left and right vertical edges of the inner periphery of said opening while said second ribs are formed along the upper and lower horizontal edges of the inner periphery of said opening.

4. A bezel according to claim 1, wherein said first ribs are formed along the left and right vertical edges and central portions of the upper and lower horizontal edges of the inner periphery of said opening while said second ribs are formed along the remaining portions of the upper and lower horizontal edges of the inner periphery of said opening.

* * * * *